(12) United States Patent
Laine et al.

(10) Patent No.: US 11,062,215 B2
(45) Date of Patent: Jul. 13, 2021

(54) USING DIFFERENT DATA SOURCES FOR A PREDICTIVE MODEL

(71) Applicant: Microsoft Technology Licensing, LLC, Redmond, WA (US)

(72) Inventors: Kim Henry Martin Laine, Seattle, WA (US); Ran Gilad-Bachrach, Hogla (IL); Melissa E. Chase, Seattle, WA (US); Kristin Estella Lauter, Redmond, WA (US); Peter Byerley Rindal, Corvallis, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1026 days.

(21) Appl. No.: 15/619,201

(22) Filed: Jun. 9, 2017

(65) Prior Publication Data

US 2018/0268306 A1 Sep. 20, 2018

Related U.S. Application Data

(60) Provisional application No. 62/472,962, filed on Mar. 17, 2017.

(51) Int. Cl.
*G06F 17/00* (2019.01)
*G06N 5/00* (2006.01)
(Continued)

(52) U.S. Cl.
CPC .............. *G06N 5/04* (2013.01); *G06F 16/27* (2019.01); *G06F 17/11* (2013.01); *G06F 17/18* (2013.01);
(Continued)

(58) Field of Classification Search
CPC .......... G06F 16/27; G06F 17/11; G06F 17/18; G06F 21/6254; G06K 9/6261;
(Continued)

(56) References Cited

U.S. PATENT DOCUMENTS 9,984,337 B2 5/2018 Kadav et al.
2005/0021488 A1 1/2005 Agrawal et al.
(Continued)

OTHER PUBLICATIONS

Yang, et al., "Privacy-Preserving Classification of Customer Data without Loss of Accuracy", In Proceedings of the Fifth SIAM International Conference on Data Mining, Apr. 21, 2005, pp. 1-11.
(Continued)

*Primary Examiner* — Luis A Sitiriche
(74) *Attorney, Agent, or Firm* — Alleman Hall Creasman & Tuttle LLP

(57) ABSTRACT

Techniques for using different data sources for a predictive model are described. According to various implementations, techniques described herein enable different data sets to be used to generate a predictive model, while minimizing the risk that individual data points of the data sets will be exposed by the predictive model. This aids in protecting individual privacy (e.g., protecting personally identifying information for individuals), while enabling robust predictive models to be generated using data sets from a variety of different sources.

17 Claims, 10 Drawing Sheets

(51) Int. Cl.

| | |
|---|---|
| *G06N 5/04* | (2006.01) |
| *G06F 16/27* | (2019.01) |
| *H04L 9/08* | (2006.01) |
| *G06F 17/18* | (2006.01) |
| *G06K 9/62* | (2006.01) |
| *G06N 20/00* | (2019.01) |
| *G06F 21/62* | (2013.01) |
| *G06F 17/11* | (2006.01) |
| *G06N 3/04* | (2006.01) |
| *G06N 3/08* | (2006.01) |

(52) U.S. Cl.
CPC ....... *G06F 21/6254* (2013.01); *G06K 9/6261* (2013.01); *G06N 3/04* (2013.01); *G06N 3/084* (2013.01); *G06N 5/003* (2013.01); *G06N 20/00* (2019.01); *H04L 9/085* (2013.01)

(58) Field of Classification Search
CPC .......... G06N 20/00; G06N 3/04; G06N 3/084; G06N 5/003; G06N 5/04; H04L 9/085
See application file for complete search history.

(56) References Cited

U.S. PATENT DOCUMENTS

| | | | | |
|---|---|---|---|---|
| 2009/0187522 | A1* | 7/2009 | Fung | G06K 9/62 706/46 |
| 2013/0145473 | A1* | 6/2013 | Cormode | G11B 20/00086 726/26 |
| 2015/0089243 | A1 | 3/2015 | Veugen | |
| 2015/0161439 | A1 | 6/2015 | Krumm et al. | |
| 2015/0324686 | A1 | 11/2015 | Julian et al. | |
| 2016/0283738 | A1* | 9/2016 | Wang | G06F 21/6254 |
| 2017/0109322 | A1 | 4/2017 | McMahan et al. | |
| 2018/0025160 | A1* | 1/2018 | Hwang | G06F 8/71 726/25 |
| 2018/0268283 | A1 | 9/2018 | Gilad-bachrach et al. | |
| 2019/0372754 | A1 | 12/2019 | Gou et al. | |

OTHER PUBLICATIONS

Djatmiko, et al., "Federated flow-based approach for privacy preserving connectivity tracking", In Proceedings of the ninth ACM conference on Emerging networking experiments and technologies, Dec. 9, 2013, pp. 429-440.

Abadi, et al., "Deep learning with differential privacy", In Proceedings of the ACM SIGSAC Conference on Computer and Communications Security, Oct. 24, 2016, pp. 308-318.

Araki, et al., "High-throughput semihonest secure three-party computation with an honest majority", In Proceedings of the ACM SIGSAC Conference on Computer and Communications Security, Oct. 24, 2016, pp. 805-817.

Bansal, et al., "Privacy Preserving Back-Propagation Neural Network Learning over Arbitrarily Partitioned Data", In Journal of Neural Computing and Applications, vol. 20, Issue 1, Feb. 1, 2011, pp. 1-7.

Barni, et al., "A Privacy-Preserving Protocol for Neural-Network-Based Computation", In Proceedings of the 8th workshop on Multimedia and security, Sep. 26, 2006, pp. 146-151.

Beimel, Amos, "Secret-sharing schemes: a survey", In International Conference on Coding and Cryptology, May 30, 2011, 36 Pages.

Catak, Ozgur, Ferhat, "Secure Multi-Party Computation Based Privacy Preserving Extreme Learning Machine Algorithm over Vertically Distributed Data", In Journal of Computing Research Repository, Feb. 9, 2016, 10 Pages.

Chen, et al., "Privacy Preserving Back-Propagation Neural Network Learning", Retrieved from: http://biocomputing.cse.buffalo.edu/publication/papers/back-propagation-chen-zhong-2009.pdf, Retrieved Date: Mar. 27, 2017, 11 Pages.

Danner, et al., "Fully Distributed Privacy Preserving Mini-Batch Gradient Descent Learning", In Proceedings of the 15th IFIP WG 6.1 International Conference on Distributed Applications and Interoperable Systems, vol. 9038, Jun. 2, 2015, pp. 1-14.

Dekel, et al., "Optimal distributed online prediction using mini-batches", In Journal of Machine Learning Research, Jan. 13, 2012, pp. 165-202.

Dwork, et al., "Calibrating Noise to Sensitivity in Private Data Analysis", In Proceedings of the Third conference on Theory of Cryptography, vol. 3876, Mar. 4, 2006, 20 Pages.

Dwork, et al., "The Algorithmic Foundations of Differential Privacy", In Foundations and Trends in Theoretical Computer Science, vol. 9, Issue 3, Aug. 11, 2014, 26 Pages.

Dwork, et al., "Our Data, Ourselves: Privacy via Distributed Noise Generation", In Proceedings of the 24th Annual International Conference on the Theory and Applications of Cryptographic Techniques, May 28, 2006, 18 Pages.

Emekci, et al., "Privacy preserving decision tree learning over multiple parties", In Journal of Data & Knowledge Engineering, vol. 63, Issue 2, Nov. 1, 2007, 14 Pages.

Fong, et al., "Privacy preserving decision tree learning using unrealized data sets", In Journal of IEEE Transactions on Knowledge and Data Engineering, vol. 24, Issue 2, Feb. 1, 2012, pp. 353-364.

Friedman, et al., "Data mining with differential privacy", In Proceedings of the 16th ACM SIGKDD international conference on Knowledge discovery and data mining, Jul. 25, 2010, pp. 493-502.

Gangrade, et al., "Privacy Preserving Two-Layer Decision Tree Classifier for Multiparty Databases", In International Journal of Computer and Information Technology, vol. 1, Issue 1, Sep. 2012, pp. 77-82.

Guang, et al., "A Privacy Preserving Neural Network Learning Algorithm for Horizontally Partitioned Databases", In Journal of Information Technology, vol. 9, Issue 1, Jan. 2009, pp. 1-10.

Han, et al., "Preemptive Measures against Malicious Party in Privacy-Preserving Data Mining", In Proceedings of the SIAM International Conference on Data Mining, Apr. 24, 2008, pp. 375-386.

Jagannathan, et al., "A Practical Differentially Private Random Decision Tree Classifier", In Journal of IEEE International Conference on Data Mining Workshops, Dec. 6, 2009, pp. 273-295.

Kairouz, et al., "The composition theorem for differential privacy", In Proceedings of IEEE Transactions on Information Theory, vol. 63, Issue 6, Jun. 2017, 32 Pages.

Kelley, Henry J., "Gradient theory of optimal flight paths", In Ars Journal, vol. 30, Issue 10, Oct. 1960, pp. 947-954.

Kingma, et al., "Adam: A method for stochastic optimization", In Journal of The Computing Research Repository, Dec. 22, 2014, pp. 1-15.

Krizhevsky, et al., "ImageNet Classification with Deep Convolutional Neural Networks", In Journal of Advances in Neural Information Processing Systems, Dec. 3, 2012, pp. 1-9.

Lindell, et al., "Privacy Preserving Data Mining", In Proceedings of the Annual International Cryptology Conference, Aug. 20, 2000, 28 Pages.

Liu, et al., "A Collaborative Privacy-Preserving Deep Learning System in Distributed Mobile Environment", In Proceedings of International Conference on Computational Science and Computational Intelligence, Dec. 15, 2016, pp. 192-197.

"International Search Report and Written Opinion Issued in PCT Application No. PCT/US18/022969", dated Dec. 20, 2018, 11 Pages.

Rana, et al., "Differentially private random forest with high utility", In Proceedings of the IEEE International Conference on Data Mining, Nov. 14, 2015, pp. 955-960.

Secretan, et al., "A Privacy Preserving Probabilistic Neural Network for Horizontally Partitioned Databases", In International Joint Conference on Neural Networks, Aug. 12, 2007, 6 Pages.

Shamir, Adi, "How to Share a Secret", In Communication of the ACM, vol. 22, Issue 11, Nov. 1, 1979, 2 Pages.

Song, et al., "Stochastic gradient descent with differentially private updates", In Proceedings of IEEE Global Conference on Signal and Information Processing, Dec. 3, 2013, pp. 245-248.

(56) References Cited

OTHER PUBLICATIONS

Takabi, et al., "Differentially Private Distributed Data Analysis", In IEEE 2nd International Conference on Collaboration and Internet Computing, Nov. 1, 2016, pp. 212-218.
Yao, Andrew C., "Protocols for Secure Computations", In 23rd Annual Symposium on Foundations of Computer Science, Nov. 3, 1982, 5 Pages.
Zhang, et al., "Distributed Data Mining with Differential Privacy", In IEEE International Conference on Communications, Jun. 5, 2011, pp. 1-5.
"Final Office Action Issued in U.S. Appl. No. 15/639,557", dated Dec. 28, 2020, 24 Pages.
Yuan, et al., "Privacy Preserving Back-Propagation Neural Network Learning Made Practical with Cloud Computing", In IEEE Transactions on Parallel and Distributed Systems, vol. 25, Issue 1, Jan. 2013, pp. 212-221.
"Non Final Office Action Issued in U.S. Appl. No. 15/639,557", dated Sep. 4, 2020, 21 Pages.
Barni, et al., "Privacy-Preserving ECG Classification with Branching Programs and Neural Networks", In Proceedings of IEEE Transactions on Information Forensics and Security, vol. 6, Issue 2, Jan. 28, 2011, pp. 452-468.
Shokri, et al., "Privacy-Preserving Deep Learning", In Proceedings of 53rd Annual Allerton Conference on Communication, Control, and Computing (Allerton), Sep. 29, 2015, pp. 909-910.
"Non Final Office Action Issued in U.S. Appl. No. 15/639,557", dated Apr. 27, 2021, 30 Pages.

\* cited by examiner

US 11,062,215 B2

USING DIFFERENT DATA SOURCES FOR A PREDICTIVE MODEL

RELATED APPLICATION

This application claims priority to U.S. provisional application No. 62/472,962, filed on 17 Mar. 2017 and titled "Predictive Modeling," the disclosure of which is incorporated by reference in its entirety herein.

BACKGROUND

Today's era of "big data" includes different data systems with access to tremendous amounts of data of a variety of different types, such as consumer data, educational data, medical data, social networking data, and so forth. This data can be processed in various ways and utilized for different useful purposes. Educational data, for instance, can be analyzed to identify different trends and outcomes in educational processes to optimize those processes. Medical data can be analyzed to identify predictive indicators of different medical conditions. Protecting privacy of individuals associated with data, however, is of paramount importance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for using different data sources for a predictive model are described. According to various implementations, techniques described herein enable different data sets to be used to generate a predictive model, while minimizing the risk that individual data points of the data sets will be exposed by the predictive model. This aids in protecting individual privacy (e.g., protecting personally identifying information for individuals), while enabling robust predictive models to be generated using data sets from a variety of different sources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Identical numerals followed by different letters in a reference number may refer to difference instances of a particular item.

DETAILED DESCRIPTION

Figure 1:
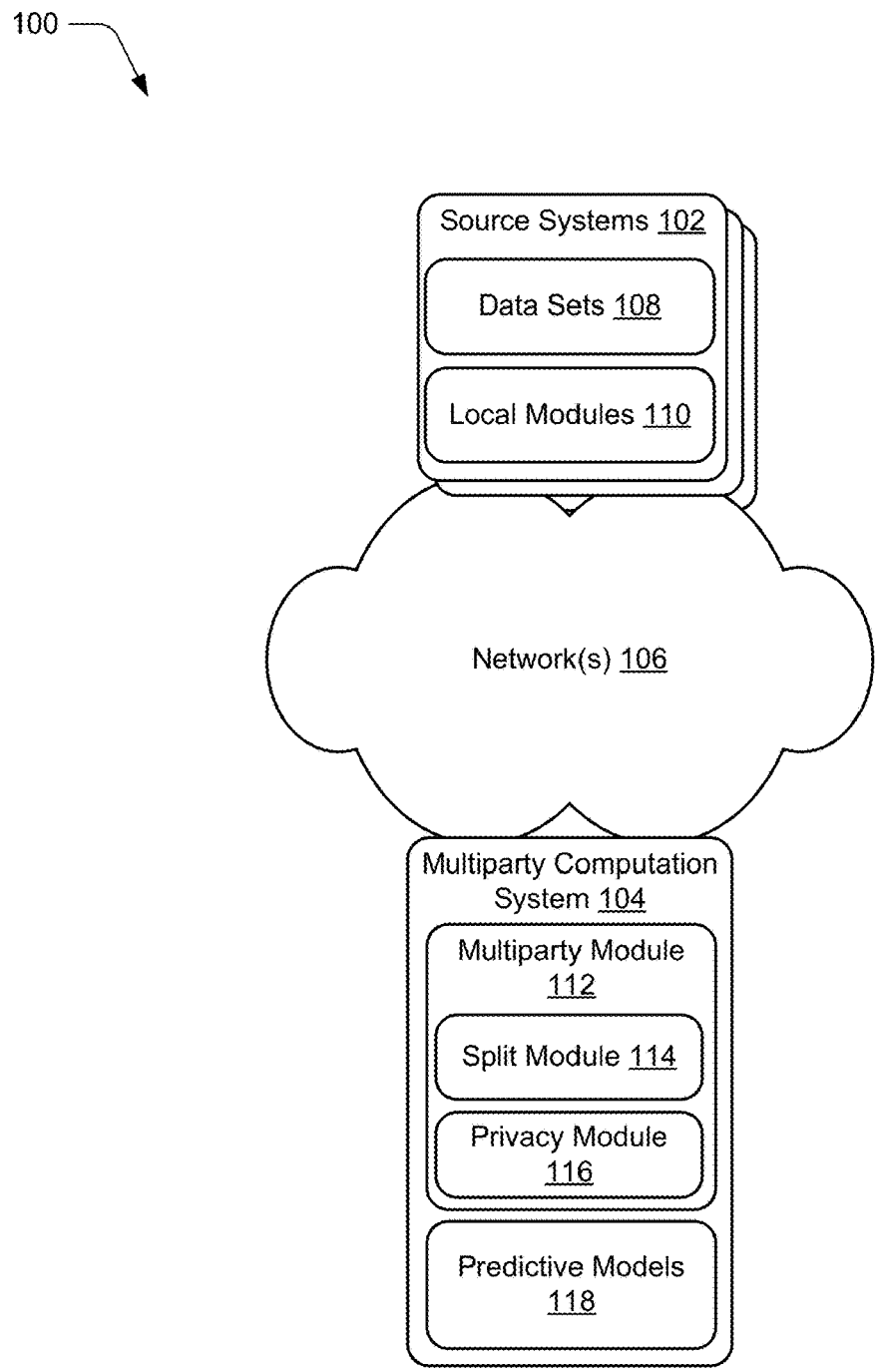
FIG. 1 is an illustration of an environment in an example implementation that is operable to employ techniques discussed herein.

Techniques for using different data sources for a predictive model are described. Generally, a predictive model represents a collection of evaluable conditions to which a data set can be applied to determine a possible, predicted outcome. Examples of a predictive model include a decision tree, a random forest, a boosted tree, and so forth.

According to various implementations, techniques described herein enable different data sets to be used to generate a predictive model, while minimizing the risk that individual data points of the data sets will be exposed by the predictive model. This aids in protecting individual privacy (e.g., protecting personally identifying information for individuals), while enabling robust predictive models to be generated using data sets from a variety of different sources.

In example implementations, different data sources with different data sets sort their local data sets, and submit statistics about their local data sets to an external system that processes the statistics to determine optimal ways of partitioning (e.g., splitting) the local data sets to generate a statistical model. The external system, for example, determines splitting values to be used to split the local data sets into data subsets. Further, the external system adds noise to the splitting values to avoid directly or inferentially exposing information about individual data points of the local data sets. The noisy splitting values are used to generate different split points of a predictive model. The noisy splitting values, for example, are used to train a predictive model using local data sets from different data sources.

According to various implementations, data sets used to generate a predictive model can be very large. Thus, techniques described herein enable local data sources that maintain the data sets to perform various local computations on their large data sets to generate smaller summary data sets that sum different data values based on different possible split points within the data sets. The summary data sets can then be communicated to an external system that uses the summary data sets to calculate optimum splits points for the data sets and add noise to the optimum split points for generating a predictive model that protects individual data points from exposure outside their respective data sets.

Thus, techniques described herein protect individual and group privacy by reducing the likelihood that individual records of a data set will be exposed when generating a predictive model using the data set. Further, computational and network resources are conserved by enabling local data sources to perform computations of summary data (e.g., summations) for their own respective data sets, and enabling an external system to use the summations to generate a predictive model based on the different data sets. The external system, for example, need not process entire large data sets, but can perform various calculations described herein using smaller data sets that summarize the larger data sets.

In the following discussion, an example environment is first described that is operable to employ techniques described herein. Next, some example implementation scenarios are described in accordance with one or more implementations. Following this, some example procedures are described in accordance with one or more implementations. Finally, an example system and device are described that are operable to employ techniques discussed herein in accordance with one or more implementations. Consider now an example environment in which example implementations may by employed.

FIG. 1 is an illustration of an environment 100 in an example implementation that is operable to employ techniques for using different data sources for a predictive model described herein. Generally, the environment 100 includes various devices, services, and networks that enable data communication via a variety of different modalities. For instance, the environment 100 includes source systems 102 and a multiparty computation system ("multiparty system") 104 connected to a network 106. Generally, the source systems 102 represent different data sources that can provide data for generating predictive models. The source systems 102 include various instances of information systems that collect and aggregate different types of data, such as medical information (e.g., patient records, medical statistics, and so forth) from medical institutions, education information from educational institutions, consumer information from enterprise entities, government information from governmental entities, social networking information regarding users of different social networking platforms, and so on. The source systems 102 may be implemented in various ways, such as servers, server systems, distributed computing systems (e.g., cloud servers), corpnets, and so on. Examples of different implementations of the source systems 102 are described below with reference to the example system 1000.

The source systems 102 include data sets 108 and local computation modules ("local modules") 110. The data sets 108 represent sets of different types of data, examples of which are described above. Generally, each of the source systems 102 aggregates and maintains its own respective data set 108. The local modules 110 represent functionality for performing different sets of computations on the data sets 108 as well as other types of data. As further detailed herein, some forms of computation can be performed locally by the local modules 110, while others can be performed at the multiparty system 104.

The multiparty system 104 is representative of functionality to perform various computations outside of the context of the source systems 102. For instance, the multiparty system 104 can receive data from the source systems 102, and can perform different calculations using the data. Accordingly, the multiparty system 104 includes a multiparty computation module ("multiparty module") 112, which in turn includes a split module 114 and a privacy module 116. In accordance with implementations for using different data sources for a predictive model described herein, the multiparty module 112 and its different constituent modules represent functionality for performing various calculations on data received from the source systems 102 to generate predictive models 118. Generally, the predictive models 118 represent statistical models that are generated based on attributes of the data sets 108 and that can be used to predict various outcomes dependent on input data values. Examples of the predictive models 118 includes decision trees such as boosted trees and random forests.

As further detailed below, cooperation between the source systems 102 and the multiparty system 104 enables various attributes of the different data sets 108 to be used to generate the predictive models 118, while protecting the raw data from an individual data set 108 from being exposed (e.g., directly or inferred) across the different source systems 102. This enables multiple data sets 108 to be used to generate an individual predictive model 118 thus increasing a robustness and accuracy of the individual predictive model 118, while protecting a data set 108 from one source system 102 from being exposed to a different source system 102.

The network 106 is representative of a network that provides the source systems 102 and the multiparty system 104 with connectivity to various networks and/or services, such as the Internet. The network 106 may be implemented via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 106 represents different interconnected wired and wireless networks.

While the source systems 102 and the multiparty system 104 are depicted as being remote from one another, it is to be appreciated that in one or more implementations, one or more of the source systems 102 and the multiparty system 104 may be implemented as part of a single, multifunctional system to perform various aspects of using different data sources for a predictive model described herein. For instance, in some implementations, the multiparty system 104 can be implemented as a secure hardware environment that is local to a particular source system 102, but that is protected from tampering by functionalities outside of the secure hardware environment.

Having described an example environment in which the techniques described herein may operate, consider now a discussion of some example implementation scenarios for using different data sources for a predictive model in accordance with one or more implementations. The implementation scenarios may be implemented in the environment 100 discussed above, the system 1000 described below, and/or any other suitable environment.

Figure 2:
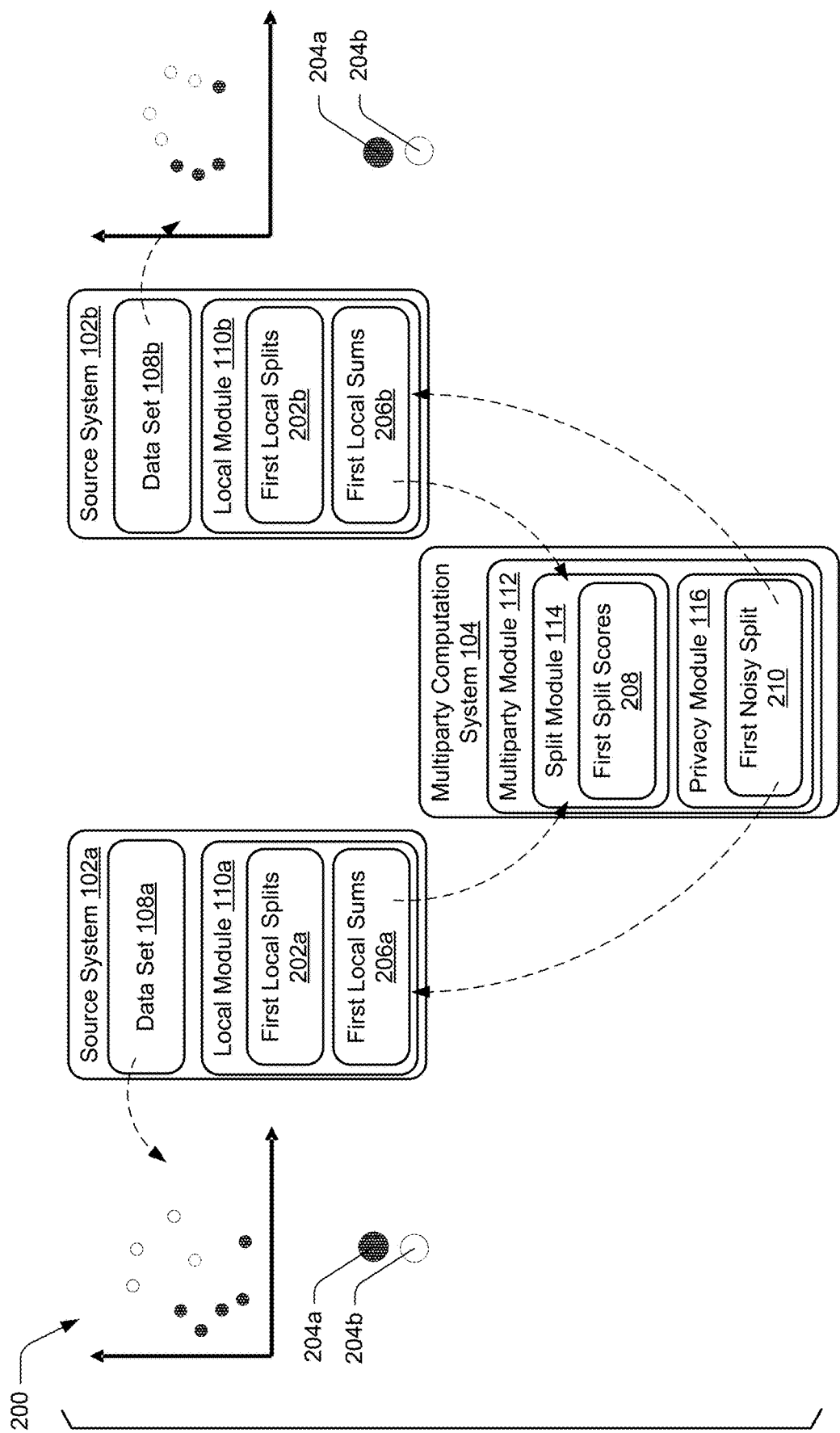
FIG. 2 depicts an example implementation scenario for partitioning data sets for a predictive model in accordance with one or more implementations.

FIG. 2 depicts an example implementation scenario 200 for partitioning data sets for a predictive model in accordance with one or more implementations. The scenario 200 includes various entities and components introduced above with reference to the environment 100.

The scenario 200 includes a source system 102a and a source system 102b, which represent implementations of the source systems 102 introduced above. The source system 102a maintains a data set 108a, and the source system 102b maintains a data set 108b. In at least some implementations, the data sets 108a, 108b represent different collections of different instances of a same type of data, such as medical data, education data, enterprise data, and so forth. As part of the scenario 200, the source systems 102a, 102b cooperate to generate a predictive model using the data sets 108a, 108b.

Accordingly, each of the source systems 102a, 102b sums data points that reside on either side of different splitting values. The local module 110a for the source system 102a, for example, determines a set of first local splits 202a which represents different ways for splitting the data set 108a into different subsets of data. For instance, consider that the data set 108a includes data points for two different value sets of data, which are represented by data points 204a represented by shaded circles for a first value set, and data points 204b represented by hollow circles for a second value set. Generally, the first local splits 202a represent different ways of splitting the data points 204a, 204b into two different respective subsets. Example ways of splitting a data set into subsets are discussed below.

The local module 110a then calculates first local sums 206a that represent sums of data points across each of the first local splits 202a. For instance, consider that the first local splits 202a split the data points 204a, 204b into sets of two different subsets at different split points. Accordingly, the first local sums 206a each sum a number of the data points 204a, 204b that reside in a first subset, and a number of the data points 204a, 204b that reside in a second subset. This summing is performed across a variety of different split points to determine the first local sums 206a.

Further to the scenario 200, the local module 110b of the source system 102b determines first local splits 202b for the data set 108b. Generally, the first local splits 202b represent different ways for splitting the data set 108b into different subsets of data. Examples of splitting data sets into different subsets are discussed below. The local module 110b then calculates first local sums 206b for the first local splits 202b.

The source systems 102a, 102b then communicate their respective first local sums 206a, 206b to the multiparty system 104, and the split module 108 utilizes the first local sums 206a, 206b to calculate first split scores 208. Generally, the first split scores 208 are calculated as a raw split score for each split represented by the local sums 206a, 206b, and a noise term is then added to each raw split score. As further detailed below, each raw split score can be calculated as a loss function (e.g., a squared loss function, an absolute loss function, and so forth) that represents a variance between values for the data points 204a, 204b and different split points of the data sets 108a, 108b.

The privacy module 116 then adds a noise term to each raw split score to generate the first split scores 208. In at least some implementations, a noise term can be calculated as Laplacian noise that is calculated based on Laplacian distribution of the data points from the respective data sets 108a, 108b. The privacy module 116, for example, uses techniques for differential privacy to add noise to each of the first split scores 208. Generally, adding noise to the first split scores 208 assists in hiding a contribution of a single data point from the data sets 108a, 108b to the first split scores 208, and thus increases the privacy of the first split scores 208 as compared to the raw split scores.

Further to the scenario 200, the multiparty module 108 sorts the first split scores 208 to identify a first noisy split 210, which represents a first split score 208 with the highest split score. The first noisy split 210, for example, represents a split point that most equally partitions the data sets 108a, 108b into different data subsets. For instance, with reference to the data set 108a, the first noisy split 210 represents a split point that splits the data points 204a, 204b such that a first partition includes primarily (e.g., >50%) the data points 204a, and a second partition includes primarily (e.g., >50%) data points 204b. In at least some implementations, the first noisy split 210 represents a noisy split with the highest variance reduction as calculated using a loss function. The multiparty system 104 then communicates the first noisy split 210 to each of the source systems 102a, 102b.

Figure 3:
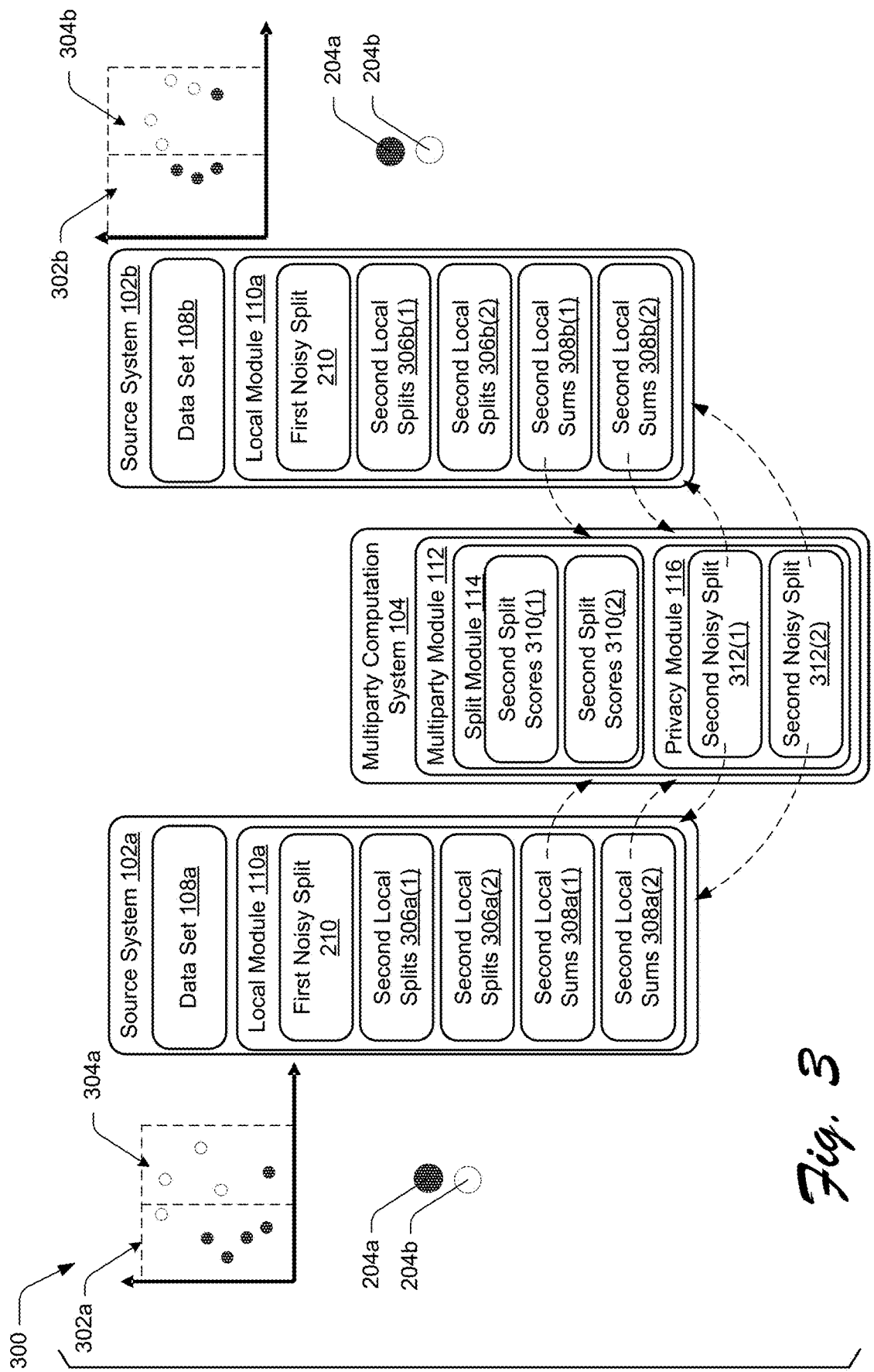
FIG. 3 depicts an example implementation scenario for further partitioning data sets for a predictive model in accordance with one or more implementations.

FIG. 3 depicts an example implementation scenario 300 for further partitioning data sets for a predictive model in accordance with one or more implementations. The scenario 300 generally represents a continuation of the scenario 200.

In the scenario 300, the source systems 102a, 102b receive the first noisy split 210 and use the first noisy split 210 to partition their respective data sets 108a, 108b. For instance, the local module 110a uses the first noisy split 210 to partition the data set 108a into a first partition 302a and a second partition 304a. Further, the local module 110b uses the first noisy split 210 to partition the data set 108b into a first partition 302b and a second partition 304b. Generally, the partitions for the data sets 108a, 108b seek to divide the data subsets such that each partition includes primarily one type of data point values. For instance, notice that the first partition 302a includes primarily the data points 204a, and the second partition 304a includes primarily the data points 204b.

After partitioning the respective data sets 108a, 108b using the first noisy split 210, the local modules 110a, 110b determine different splits for splitting their respective partitions into different subsets of data. The local module 110a, for instance, determines a set of second local splits 306a(1) for the first partition 302a and a set of second local splits 306a(2) for the second partition 304a. At the source system 102b, the local module 110b determines a set of second local splits 306b(1) for the first partition 302b and a set of second local splits 306b(2) for the second partition 304b.

Further to the scenario 300, the source systems 102a, 102b calculate sums based on the splits for the different partitions. The local module 110a, for example, calculates second local sums 308a(1) for the second local splits 306a(1), and second local sums 308a(2) for the second local splits 306a(2). Further, the local module 110b calculates second local sums 308b(1) for the second local splits 306b(1), and second local sums 308b(2) for the second local splits 306b(2). Generally, the different local sums represent different ways of splitting the respective partitions into different subsets of data points.

The source system 102a then communicates the second local sums 308a(1), 308a(2) to the multiparty system 104, and the source system 102b communicates the second local sums 308b(1), 308b(2) to the multiparty system 104. The split module 114 uses the second local sums 308a(1), 308b(1) to calculate a second split scores 310(1) for the first partitions 302a, 302b. Further, the split module 114 uses the second local sums 308a(2), 308b(2) to calculate second split scores 310(2) for the second partitions 304a, 304b. Generally, the split module 114 calculates the second split scores 310(1), 310(2) as a raw split score for each split represented by the different second local sums 308, and the privacy module 116 adds a noise term to each raw split score. Different ways of calculating a raw split score and adding a noise term are discussed elsewhere in this disclosure.

Continuing with the scenario 300, the multiparty module 112 sorts the second split scores 310(1) to identify a second noisy split 312(1), which represents a second split score 310(1) with the highest split score. The second noisy split 312(1), for example, represents a split point that most equally partitions the partitions 302a, 302b into different data subsets of the respective data points 204a, 204b. The multiparty module 112 further sorts the second split scores 310(2) to identify a second noisy split 312(2), which represents a second split score 310(2) with the highest split score. The second noisy split 312(2), for example, represents a split point that most equally partitions the partitions 304a, 304b into different data subsets of the respective data points 204a, 204b. In at least some implementations, the second noisy splits 312(1), 312(2) represent noisy splits with the highest variance reduction for their respective partitions, as calculated using a loss function. The multiparty system 104 then communicates the second noisy splits 312(1), 312(2) to each of the source systems 102a, 102b.

Figure 4:
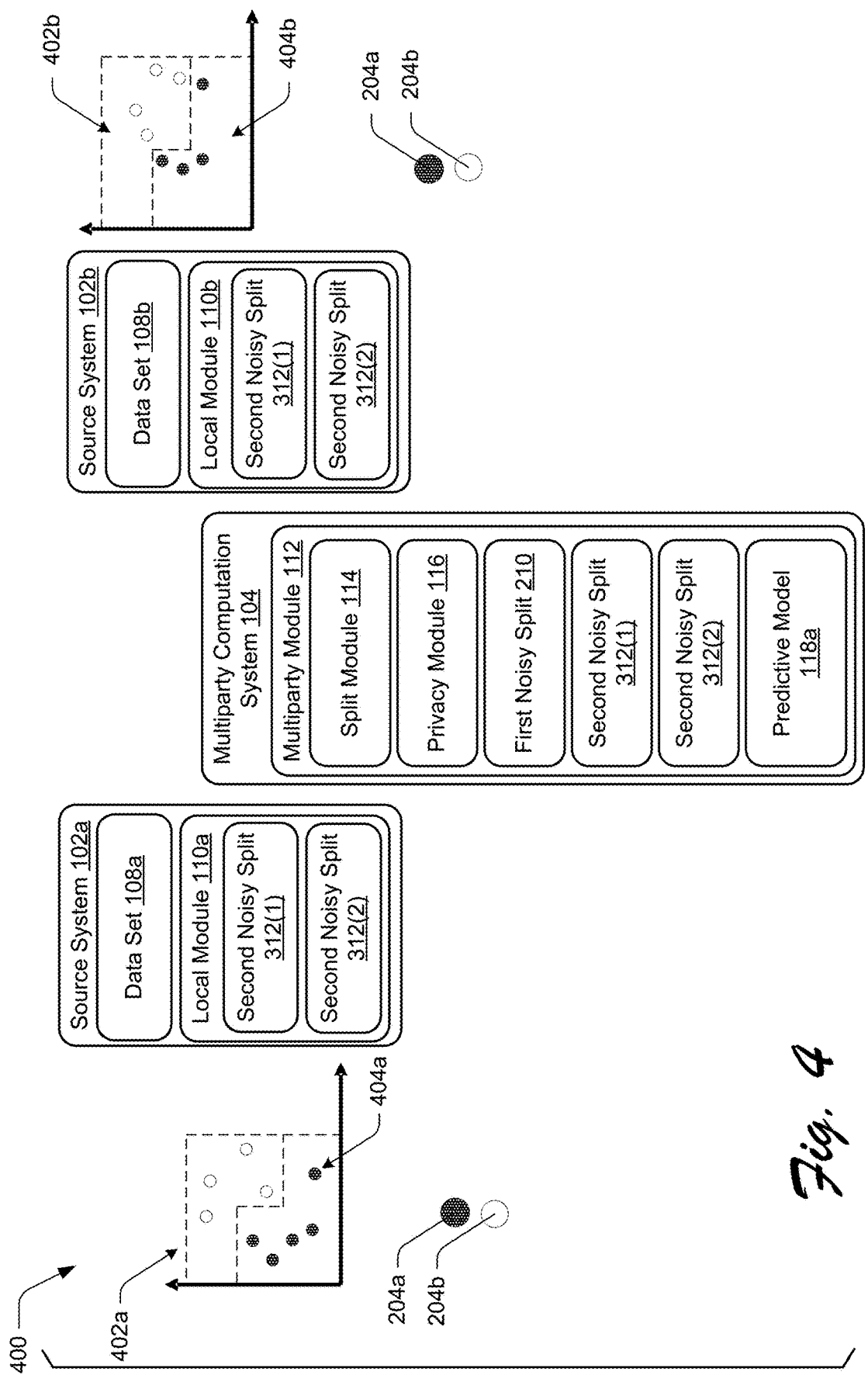
FIG. 4 depicts an example implementation scenario for generating a predictive model in accordance with one or more implementations.

FIG. 4 depicts an example implementation scenario 400 for generating a predictive model in accordance with one or more implementations. The scenario 400 generally represents a continuation of the scenarios 200, 300.

In the scenario 400, the source systems 102a, 102b receive the second noisy splits 312(1), 312(2) and use the second noisy splits 312(1), 312(2) to further partition their respective partitioned data sets 108a, 108b. For instance, the local module 110a uses the second noisy splits 312(1), 312(2) to partition the first partition 302a and the second partition 304a to generate a third partition 402a and a fourth partition 404a. Further, the local module 110b uses the second noisy splits 312(1), 312(2) to partition the first partition 302b and the second partition 304b to generate a third partition 402b and a fourth partition 404b.

According to various implementations, the data sets 108a, 108b are recursively partitioned until data points that reside resulting partitions match pre-specified data points values. For instance, partitioning the data sets 108a, 108b into their respective third partitions 402a, 402b and fourth partitions 404a, 404b represents a termination of a recursive partitioning process since the respective third partitions 402a, 402b and fourth partitions 404a, 404b each include only data points that meet specific value criteria. Notice, for example, that the third partitions 402a, 402b only include the data points 204b. Further, the fourth partitions 404a, 404b only include the data points 204a.

Further to the scenario 400, the multiparty system 104 uses the first noisy split 210 and the second noisy splits 312(1), 312(2) to generate a predictive model 118a. The first noisy split 210 and the second noisy splits 312(1), 312(2), for instance, are used to divide nodes of the predictive model 118a (e.g., a decision tree) into different branches, subtrees, and so forth. Generally, the predictive model 118a represents a statistic model that can be evaluated using data points to attempt to predict certain outcomes based on the data points. Examples of the predictive model 118a include a decision tree, a random forest, a boosted tree, and so forth.

According to various implementations, the scenarios 200-400 represent initial steps in a recursive process that can be performed to split different data sets until some termination criteria occurs. For instance, consider an example where the multiparty system 102 receives a further set of sums from the respective source systems 102a, 102b and determines based on the sums that further splitting of the respective data sets 108a, 108b would cause the resulting partitions to include a number of data points that is below a threshold number of data points. Based on this determination, the multiparty system 102 terminates the splitting process and generates the predictive model 118a based on the previously-calculated splits.

Generally, a determination as to whether a further splitting would cause a resulting partition to fall below a threshold number of data points can be performed in various ways. For instance, a scoring algorithm used to generate split scores can incorporate a split size term such that if a number of data points falls below a threshold, the split size term causes the resulting split score to fall below a threshold and thus trigger a termination of the splitting process. Alternatively or additionally, after a noisy split with a highest split score is selected, a number of data points across the split can be compared to a threshold number of data points. If the number of data points is below the threshold, this can trigger a termination of the splitting process.

Figure 5:
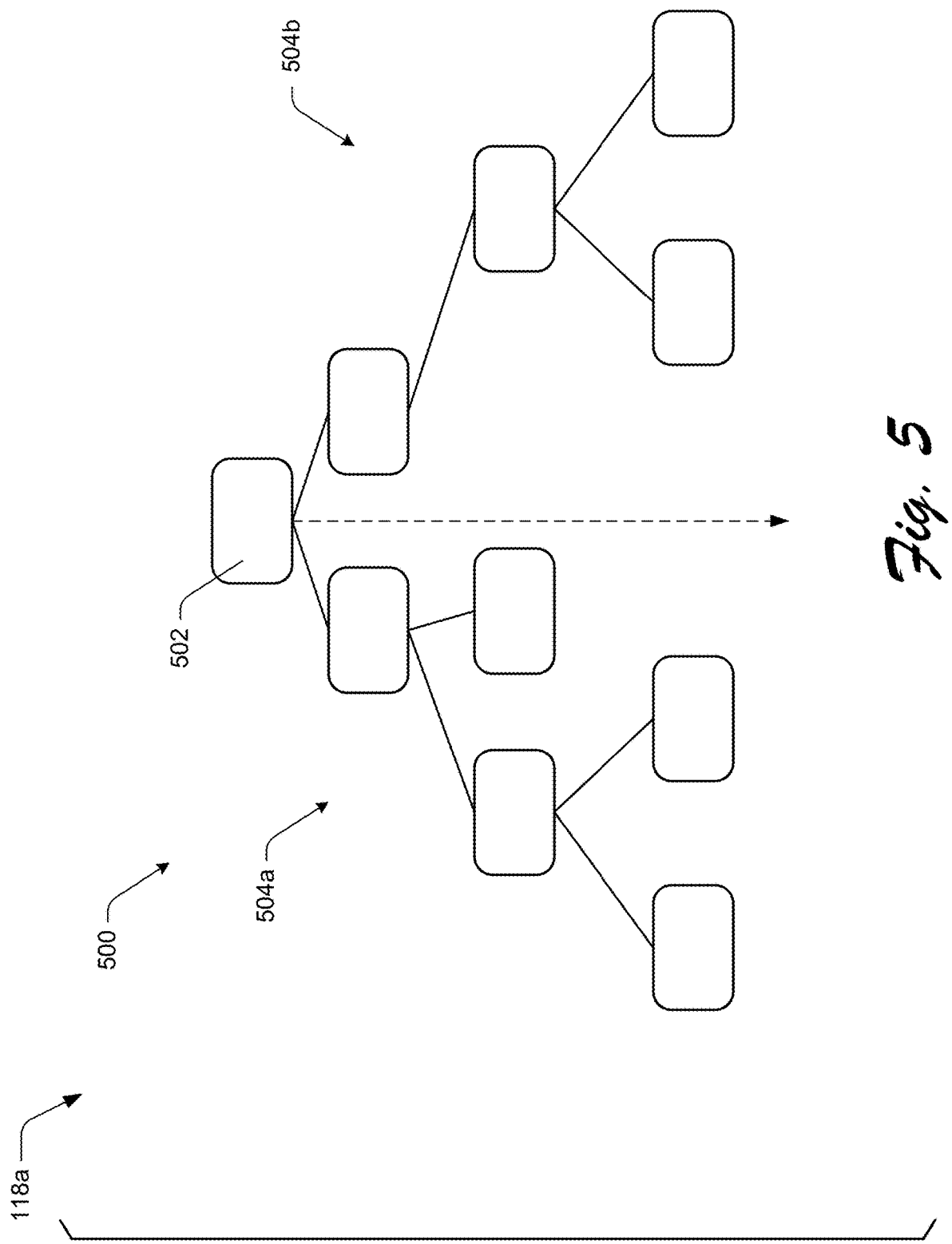
FIG. 5 depicts an example predictive model in accordance with one or more implementations.

FIG. 5 depicts an example implementation of the predictive model 118a in accordance with one or more implementations. In this particular implementation, the predictive model 118a is implemented as a decision tree 500. This is not to be construed as limiting, however, and the predictive model 118a can be implemented in various other ways.

Generally, the decision tree 500 is split at a node 502 and according to the different noisy splits calculated above. For instance, a branch 504a of the decision tree 500 corresponds to the third partitions 402a, 402b of the data sets 108a, 108b discussed above, and a branch 504b corresponds to the fourth partitions 404a, 404b of the data sets 108b. The node 502, for example, represents one of the noisy splits calculated above for splitting the data sets 108a, 108b.

In at least some implementations, the decision tree 500 depicted in FIG. 5 is only a portion of the predictive model 118a, e.g., a portion of a larger decision tree. For instance, techniques for using different data sources for a predictive model described herein can be utilized to generate predictive models of varying levels of complexity, such as highly complex decision trees that include many different nodes and evaluation paths.

Having discussed some example implementation scenarios, consider now a discussion of some example procedures in accordance with one or more implementations.

The following discussion describes some example procedures for using different data sources for a predictive model in accordance with one or more implementations. The example procedures may be employed in the environment 100 of FIG. 1, the system 1000 of FIG. 10, and/or any other suitable environment. The procedures, for instance, represent example procedures for performing the implementation scenarios described above. In at least some implementations, the steps described for the various procedures are implemented automatically and independent of user interaction.

Figure 6:
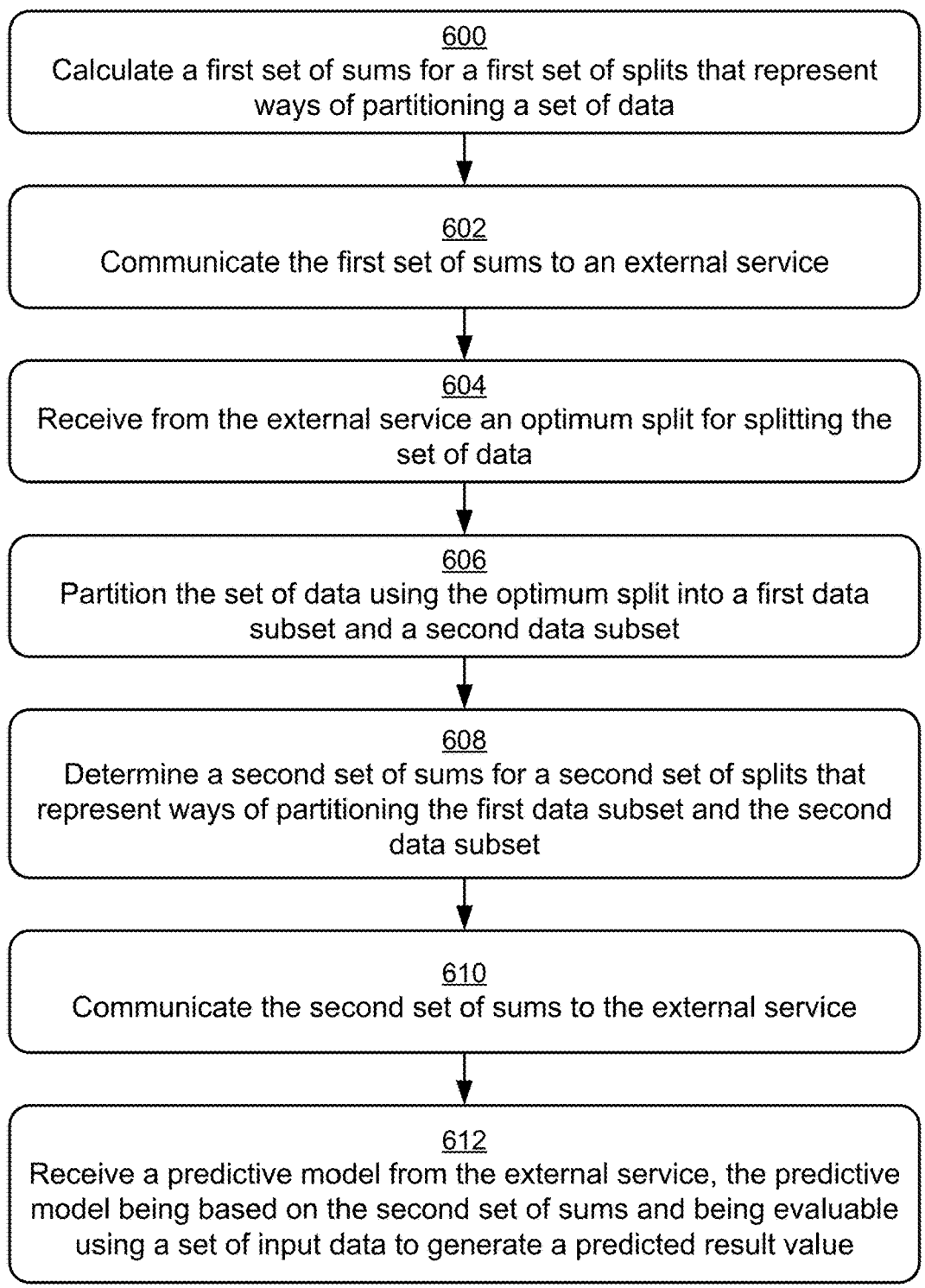
FIG. 6 is a flow diagram that describes steps in a method for enabling a predictive model to be generated in accordance with one or more implementations.

FIG. 6 is a flow diagram that describes steps in a method in accordance with one or more implementations. The method describes an example procedure for enabling a predictive model to be generated in accordance with one or more implementations.

Step 600 calculates a first set of sums for a first set of splits that represent ways of partitioning a set of data. One or more of the source systems 102, for example, determines different splitting values that each represent different ways of partitioning the respective data sets 108. For each split, a number of data points that reside on each side (e.g., partition) of the split is summed. In at least some implementations, each sum for each split is calculated as:

$$Y_{j,0} = \Sigma_{i \in I_{j,0}} y_i \text{ and } Y_{j,1} = \Sigma_{i \in I_{j,1}} y_i \qquad \text{Equation 1}$$

where $Y_{j,0}$ is a sum of data points in a first partition of a split, and $Y_{j,1}$ is a sum of data points on a second partition of a split. Here the training dataset is split into subsets according to $I_{j,0}$ and $I_{j,1}$. Each $y_i$ denotes the true value for the training data sample, and the final predictive model attempts to predict these true values. So with this particular split, $Y_{j,0}$ denotes the sum of those true values that end up in one part of the split, and $Y_{j,1}$ the sum of those that end up in the other part.

Step 602 communicates the first set of sums to an external service. A particular source system 102, for instance, communicates the sums to the multiparty system 104. Alternatively or additionally, the external service represents a protected hardware environment that is maintained locally, so as a trusted platform module (TPM) and/or other data processing environment that is protected from external tampering. In at least some implementations, the sums are communicated as a set of sums for each split, such as calculated using Equation 1.

Step 604 receives from the external service an optimum split for splitting the set of data. The optimum split, for instance, is calculated based on the sums for the first set of splits that were communicated to the external service, e.g., the multiparty system 104. Although this particular procedure is discussed from the reference point of a single set of data, it is to be appreciated that multiple different sets of splits from multiple different sets of data can be used to calculate an optimum split. Generally, the optimum split specifies a splitting value that can be used to split the set of data into different partitions Step 606 partitions the set of data using the optimum split into a first data subset and a second data subset. A source system 102, for example, uses the optimum split to partition a respective data set 108 into different partitions of data that represent different subsets of data.

Step 608 determines a second set of sums for a second set of splits that represent ways of partitioning the first data subset and the second data subset. For example, a source system 102 uses the second set of splits to further partition different existing partitions of data that include different subsets of data. The data points on either side of the second set of splits are then summed. In at least some implementations, Equation 1 above is used to sum data points for each split to determine the second set of sums.

Step 610 communicates the second set of sums to the external service. A source system 102, for example, communicates a set of sums for each split to the multiparty system 104.

Step 612 receives a predictive model from the external service, the predictive model being based on the second set of sums and being evaluable using a set of input data to generate a predicted result value. The multiparty system 104, for example, uses the various sets of sums to generate a predictive model 118 that can be evaluated using different sets of data to determine different predicted results. The multiparty system 104 can communicate the predictive model to various entities, such as the source systems 102. In at least some implementations, the predictive model includes a set of splits that can be used to split a data set into different partitions, such as for use in training a decision tree.

Figure 7:
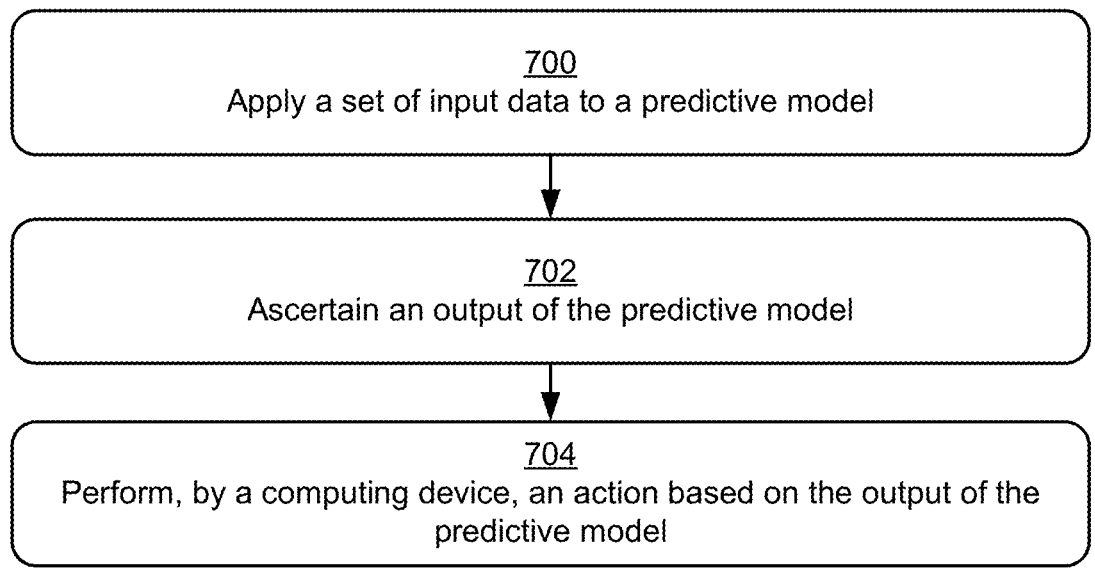
FIG. 7 is a flow diagram that describes steps in a method for utilizing a predictive model in accordance with one or more implementations.

FIG. 7 is a flow diagram that describes steps in a method in accordance with one or more implementations. The method describes an example procedure for utilizing a predictive model in accordance with one or more implementations. The method, for instance, represents a continuation of the procedure described above.

Step 700 applies a set of input data to a predictive model. A source system 102, for example, receives a set of data and uses the set of data to evaluate a predictive model generated according to techniques for using different data sources for a predictive model described herein. In at least some implementations, the set of data includes data values that are used to traverse the predictive model, e.g., to traverse a decision tree.

Step 702 ascertains an output of the predictive model. For instance, the predictive model provides an output prediction value based on values of the input data.

Step 704 performs, by a computing device, an action based on the output of the predictive model. Generally, the action can take various forms, such as performing different computation tasks based on the output of the predictive model. For example, consider that the predictive model is configured to provide a prediction of health condition. If the output of the predictive model indicates a possible adverse health condition, the action can include performing an automatic scheduling of a health procedure and/or an automatic communication to an individual regarding the possible adverse health condition.

As another example, consider that the predictive model is configured to provide a prediction of a possible computer network malfunction. For instance, the predictive model can include various conditions and events that are indicative of a potential network failure. Accordingly, the action can include performing an automated maintenance and/or diagnostic procedure on the network to attempt to prevent and/or repair a network malfunction.

These examples are presented for purpose of illustration only, and it is to be appreciated that predictive models generated and/or trained according to techniques for using different data sources for a predictive model described herein can be used for a variety of different purposes not expressly discussed in this disclosure.

Figure 8:
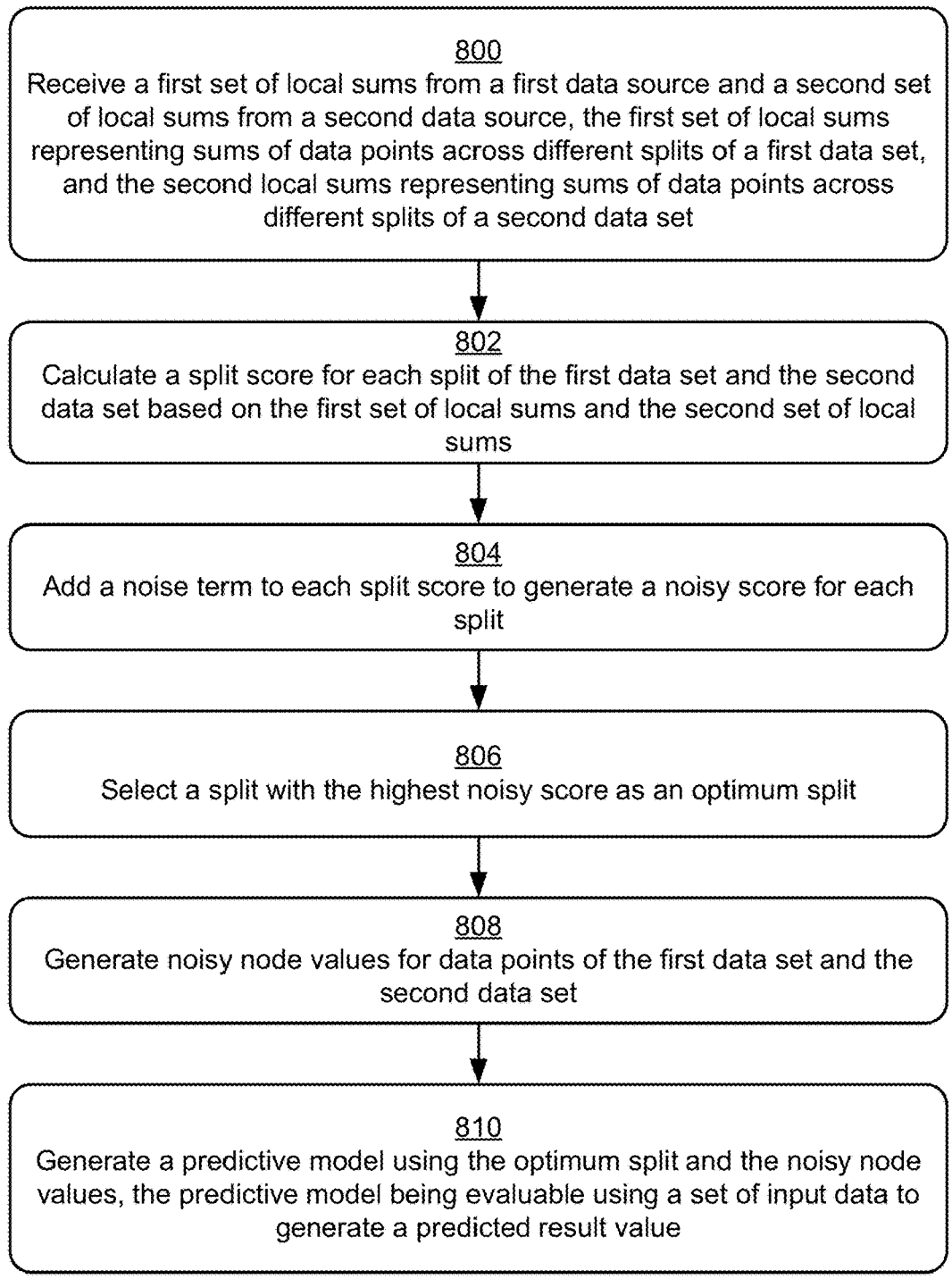
FIG. 8 is a flow diagram that describes steps in a method for generating a predictive model in accordance with one or more implementations.

FIG. 8 is a flow diagram that describes steps in a method in accordance with one or more implementations. The method describes an example procedure for generating a predictive model in accordance with one or more implementations.

Step 800 receives a first set of local sums from a first data source and a second set of local sums from a second data source, the first set of local sums representing sums of data points across different splits of a first data set, and the second local sums representing sums of data points across different splits of a second data set. The first set of local splits, for example, are received from a different source system 102 than the second set of local splits. For instance, the multiparty system 104 receives the different sets of local splits from different instances of the source systems 102. Accordingly to various implementations, the local sums do not identify individual data points from the first data set or the second data set.

Step 802 calculates a split score for each split of the first data set and the second data set based on the first set of local sums and the second set of local sums. The multiparty module 112 of the multiparty system, for example, processes the different sets of splits to calculate a score for each split.

According to various implementations, the multiparty module 112 calculates a split score for each split using the sums for each split calculated using Equation 1, above. The sums, for example, are used to evaluate a squared loss (L2) function such as the following:

$$-\frac{1}{|I_0|}(\Sigma_{i \in I_0} \ y_i)^2 - \frac{1}{|I_1|}(\Sigma_{i \in I_1} \ y_i)^2 \qquad \text{Equation 2}$$

Generally, evaluating Equation 2 using the sums for each split provides a loss reduction value for each of the splits as compared to an data set 108 without the split applied.

Step 804 adds a noise term to each split score to generate a noisy score for each split. In at least some implementations, techniques for differential privacy are applied to generate the noise terms. One example way of adding a noise term utilizes a Laplace mechanism that adds Laplace noise to each split, such as noise from a Laplace distribution of the data points in the different data sets. For instance, a noisy score for a particular split can be calculated as:

$$-\frac{1}{|I_0|}(\Sigma_{i \in I_0} \ y_i + \text{noise})^2 - \frac{1}{|I_1|}(\Sigma_{i \in I_1} \ y_i + \text{noise})^2 \qquad \text{Equation 3}$$

One particular implementation of Equation 3 is:

$$-\frac{1}{|I_0|}(\Sigma_{i \in I_0} \ y_i)^2 - \frac{1}{|I_1|}(\Sigma_{i \in I_1} \ y_i)^2 + \text{Lap}\left(\frac{\Delta f}{\epsilon}\right), \quad \text{Equation 3.1}$$

$$\text{where } \Delta f = \frac{O(a^2)}{|I|}$$

The noise term is sampled from a Laplacian with the parameter $$\left(\frac{\Delta f}{\epsilon}\right)$$

where $\Delta f$ is called the sensitivity. Here f denotes the score function of Equation 2, a is the maximum value a record can have and I is the number of elements mapped to a child node. The sensitivity generally refers to how much the value of the function (score function here) can change at most with the addition or removal of one record from the training data. To be able to bound the sensitivity, we can bound the size that the $y_i$ can take by for example specifying that anything outside the bounds does not qualify to be in the training data. For instance, consider that a denotes the largest value that any $y_i$ is permitted to take, then e.g. taking $\Delta f$ to be $$\frac{O(a^2)}{|I|}$$

is permitted. $\epsilon$ here denotes a privacy budget that is a parameter that is generally usable for differential privacy.

Step 806 selects a split with the highest noisy score as an optimum split. The noisy scores for the different splits, for example, are sorted to identify a split with the highest noisy score.

Step 808 generates noisy node values for data points of the first data set and the second data set. Generally, the noisy node values are based on a number of data points on either side of the optimum split, and can be calculated by adding Laplace noise to individual node values, such as using the equation:

$$\frac{\Sigma_{i \in I} \ y_i}{|I|} + \text{Lap}\left(\frac{a}{\epsilon}\right) \quad \text{Equation 4}$$

Here I denotes the set that ends up in a particular terminal node in a decision tree.

Step 810 generates a predictive model using the optimum split and the noisy node values, the predictive model being evaluable using a set of input data to generate a predicted result value. The predictive model, for instance, represents a decision tree that can be evaluated with a data set to obtain a predicted result based on the data set.

According to various implementations, the procedure described with reference to FIG. 8 can be performed recursively such that the multiparty system 104 communicates each optimum split to a source system 102, which uses each optimum split to partition its respective data set 108, generate further sums based on the partitioned data set, and communicate the further sums back to the multiparty system 104. The multiparty system 104 calculates additional optimum splits according to techniques described herein, and communicates the additional optimum splits back to the source system 102. This process is performed recursively until some termination criteria is met, at which point step 810 is performed generate a predictive model. In at least some implementations, a termination criteria occurs when a data subset at a particular node of a partition has the same value as a target variable, or when further partitioning no longer adds value to the predictions enabled by a resulting predictive model. According to one or more implementations, this recursive process is referred to as a top-down induction of a predictive model (e.g., a decision tree), and is an example of a greedy algorithm for training a predictive model 118.

Figure 9:
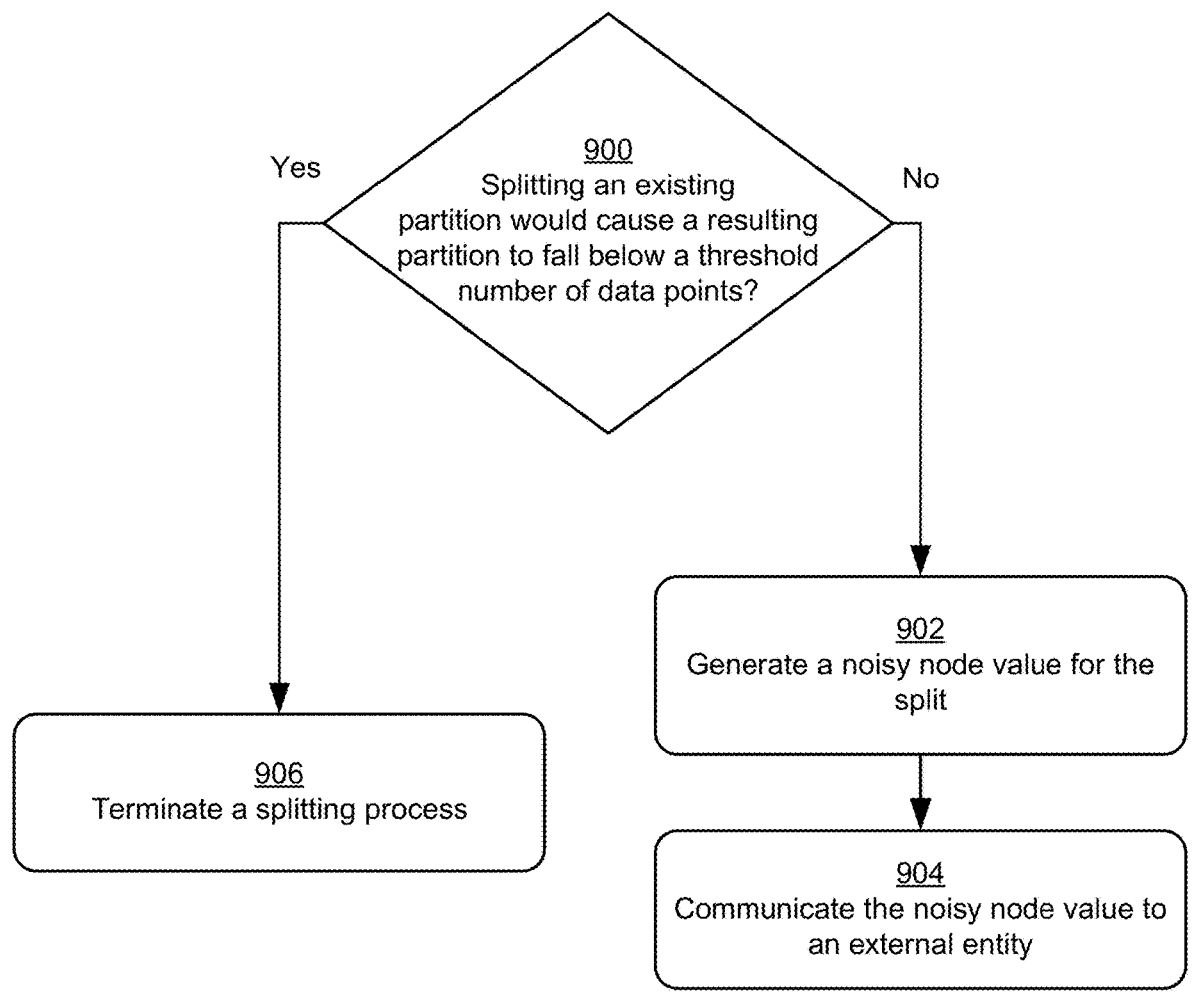
FIG. 9 is a flow diagram that describes steps in a method for determining whether to terminate a splitting process in accordance with one or more implementations.

FIG. 9 is a flow diagram that describes steps in a method in accordance with one or more implementations. The method describes an example procedure for determining whether to terminate a splitting process in accordance with one or more implementations.

Step 900 determines whether splitting an existing partition would cause a resulting partition to fall below a threshold number of data points. The existing partition, for instance, represents a partition that is generated based on a previous split value, such as described above. Generally, this determining can be made in various ways. For instance, a split score for the existing partition can be calculated that considers both a score for the split used to create the partition (e.g., with noise added, as described above), as well as a split size term that considers the number of data values that would fall on either side of the split. In one particular example, a split size term can be added to Equation 2 above that causes the resulting split score to be reduced when the number of data values that would result from the split are below a threshold number of data values.

Alternatively or additionally, a number of data values indicated in a received set of local sums can be compared to a threshold number of data values.

If splitting the existing partition would not cause the resulting partition to fall below the threshold number of data points ("No"), step 902 generates a noisy node value for the split. One example way of generating a noisy node value is discussed above with reference to FIG. 8.

Step 904 communicates the noisy node value to an external entity. The multiparty system 104, for instance, communicates the noisy node value to a set of the source systems 102. The source systems can then use the noisy node value to further partition their respective data sets, calculate sums for the further portioned data sets, and return the sums to the multiparty system 104 for further processing, such as described above.

If splitting the existing partition would cause the resulting partition to fall below the threshold number of data points ("Yes"), step 906 terminates a splitting process. The multiparty system 104, for instance, decides to terminate the recursive process described above and generate a predictive model 118 using the previously calculated noisy splits.

Thus, techniques for using different data sources for a predictive model described herein provide ways for generating predictive models based on data sets from a variety of different sources, while protecting the data used to generate the predictive models from being exposed to unauthorized parties. Further, computational resources are conserved by enabling local data sources to perform partitioning and summing of data points of large data sets, while allowing a centralized service (e.g., the multiparty system 104) to generate predictive models using the locally summed data points from the different data sources.

Having discussed some example procedures, consider now a discussion of an example system and device in accordance with one or more implementations.

Figure 10:
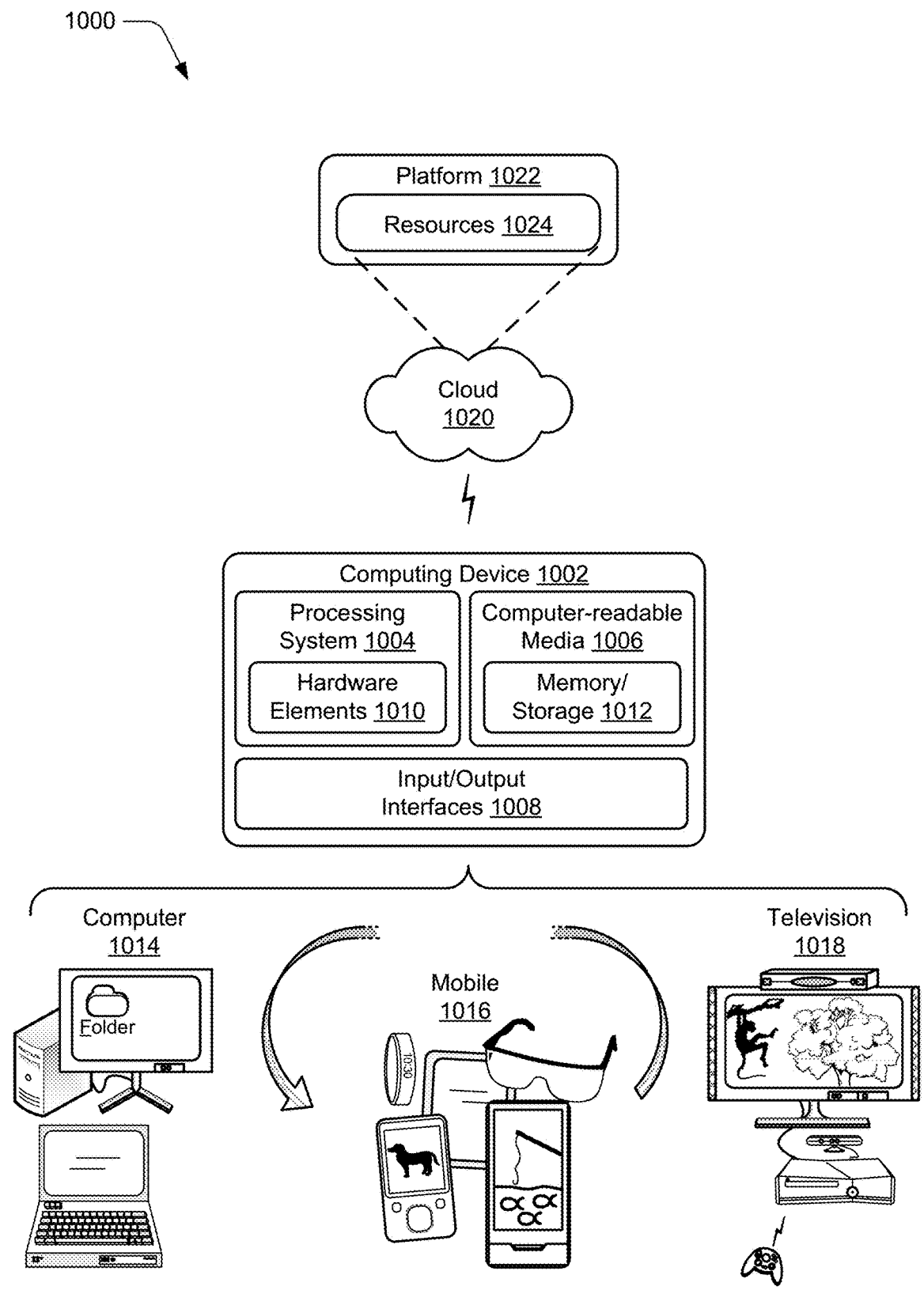
FIG. 10 illustrates an example system and computing device as described with reference to FIG. 1, which are configured to implement implementations of techniques described herein.

FIG. 10 illustrates an example system generally at 1000 that includes an example computing device 1002 that is representative of one or more computing systems and/or devices that may implement various techniques described herein. For example, the source systems 102 and/or the multiparty system 104 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a wearable device, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the source systems 102 and/or the multiparty system 104 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Techniques for using different data sources for a predictive model are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for generating a predictive model based on data sets while protecting data values of the data sets, the system including: at least one processor; and one or more computer-readable storage media including instructions stored thereon that, responsive to execution by the at least one processor, cause the system perform operations including: receiving a first set of local sums from a first data source and a second set of local sums from a second data source, the first set of local sums representing sums of data points across different splits of a first data set, and the second local sums representing sums of data points across different splits of a second data set; calculating a split score for each split of the first data set and the second data set based on the first set of local sums and the second set of local sums; adding a noise term to each split score to generate a noisy score for each split; selecting a split with a highest noisy score as an optimum split; and generating a predictive model using the optimum split, the predictive model being evaluable using a set of input data to generate a predicted result value; wherein the first set of local sums and the second set of local sums do not include data points from the first data set or the second data set; wherein said calculating the split score for each split includes calculating a score for each split using a loss function.

In addition to any of the above described systems, any one or combination of: wherein said calculating the split score for each split includes calculating a score for each split using a squared loss function; wherein said calculating the split score for each split includes calculating a score for each split using a loss function, and wherein the split with the highest noisy score corresponds to a split with the highest loss reduction; wherein said calculating the split score for each split includes using a local sum for each split to evaluate the equation:

$$-\frac{1}{|I_0|}(\Sigma_{i \in I_0} \ y_i)^2 - \frac{1}{|I_1|}(\Sigma_{i \in I_1} \ y_i)^2;$$

wherein said calculating the split score and adding a noise term to each split score is a result of the equation:

$$-\frac{1}{|I_0|}(\Sigma_{i \in I_0} \ y_i + \text{noise})^2 - \frac{1}{|I_1|}(\Sigma_{i \in I_1} \ y_i + \text{noise})^2;$$

wherein the operations further include generating noisy node values for data points of the first data set and the second data set, and wherein said generating includes generating the predictive model using the optimum split and the noisy node values; wherein the operations further include generating noisy node values for data points of the first data set and the second data set, and wherein said generating includes generating the predictive model using the optimum split and the noisy node values; wherein the operations further include: generating noisy node values for data points of the first data set and the second data set according to the equation:

$$\frac{\Sigma_{i \in I} \ y_i}{|I|} + \text{Lap}\left(\frac{a}{\epsilon}\right);$$

and generating the predictive model using the optimum split and the noisy node values; wherein the operations further include: communicating the optimum split to the first data source and the second data source; receiving a third set of local sums from the first data source and a fourth set of local sums from the second data source, the third set of local sums and the fourth set of local sums being based on partitions of the first data set and the second data set that are generated, respectively, using the optimum split; calculating a further split score for each split of the partitions of the first data set and the second data set based on the third set of local sums and the fourth set of local sums; adding a further noise term to each further split score to generate a further noisy score for each split of the partitions; selecting a split of the partitions with a highest noisy score as a further optimum split; and generating the predictive model using the further optimum split; wherein the predictive model does not expose data for individual data points of the first data set and the second data set.

A computer-implemented method for generating a predictive model based on data sets while protecting data values of the data sets, the method including: receiving a first set of local sums from a first data source and a second set of local sums from a second data source, the first set of local sums representing sums of data points across different splits of a first data set, and the second local sums representing sums of data points across different splits of a second data set; calculating a split score for each split of the first data set and the second data set based on the first set of local sums and the second set of local sums, the split scores being calculated as a function of a variance of individual sums of the first local sums and the second local sums from data points in the respective first data set and second data set; adding a noise term to each split score to generate a noisy score for each split; selecting a split with the highest noisy score as an optimum split; and generating a predictive model using the optimum split, the predictive model being evaluable using a set of input data to generate a predicted result value.

In addition to any of the above described methods, any one or combination of: wherein said calculating the split score for each split includes calculating a score for each split using a loss function, and wherein the split with the highest noisy score corresponds to a split with the highest loss reduction; further including generating noisy node values for data points of the first data set and the second data set, and wherein said generating includes generating the predictive model using the optimum split and the noisy node values.

A computer-implemented method for generating a predictive model based on data sets while protecting data values of the data sets, the method including: calculating a first set of sums for a first set of splits that represent ways of partitioning a set of data; communicating the first set of sums to an external service; receiving from the external service an optimum split for splitting the set of data; partitioning the set of data using the optimum split into a first data subset and a second data subset; determining a second set of sums for a second set of splits that represent ways of partitioning the first data subset and the second data subset; communicating the second set of sums to the external service; and receiving a predictive model from the external service, the predictive model being based on the second set of sums and being evaluable to using a set of input data to generate a predicted result value.

In addition to any of the above described methods, any one or combination of: wherein the first set of sums represent sums of data points across individual splits of the first set of splits, and the second set of sums represent sums of data points across the second set of splits; wherein one or more sums of the first set of sums are calculated as: $Y_{j,0} = \Sigma_{i \in I_{j,0}} y_i$ and $Y_{j,1} = \Sigma_{i \in I_{j,1}} y_i$, wherein $Y_{j,0}$ is a sum of data points on a first side of a particular split, and wherein $Y_{j,1}$ is a sum of data points on a second side of the particular split; wherein the first set of sums and the second set of sums are communicated to the first external service without exposing data values for data points of the set of data; further including: applying the set of input data to the predictive model; ascertaining an output of the predictive model; and performing, by a computing device, an action based on the output of the predictive model.

What is claimed is:

1. A system comprising:
at least one processor; and
one or more computer-readable storage media including instructions stored thereon that, responsive to execution by the at least one processor, cause the system perform operations including:
receiving a first set of local sums from a first data source and a second set of local sums from a second data source, the first set of local sums representing sums of data points across different splits of a first data set, and the second local sums representing sums of data points across different splits of a second data set;
calculating a split score for each split of the first data set and the second data set using a loss function that represents a variance of individual sums of the first set of local sums and the second set of local sums;
adding a noise term to each split score to generate a noisy score for each split;
selecting a split with a highest noisy score as an optimum split;
generating a predictive model using the optimum split, the predictive model being evaluable using a set of input data to generate a predicted result value;
applying the set of input data to the predictive model;
ascertaining an output of the predictive model; and
performing, by a computing device, an action based on the output of the predictive model.

2. The system as recited in claim 1, wherein the first set of local sums and the second set of local sums are not data points of the first data set or the second data set from which the first set of local sums and the second set of local sums were calculated.

3. The system of claim 1, wherein the loss function is a squared loss function.

4. The system of claim 1, wherein the split with the highest noisy score corresponds to a split with the highest loss reduction.

5. The system of claim 1, wherein the operations further include generating noisy node values for data points of the first data set and the second data set, and wherein said generating comprises generating the predictive model using the optimum split and the noisy node values.

6. The system of claim 1, wherein the operations further include:
communicating the optimum split to the first data source and the second data source;
receiving a third set of local sums from the first data source and a fourth set of local sums from the second data source, the third set of local sums and the fourth set of local sums being based on partitions of the first data set and the second data set that are generated, respectively, using the optimum split;
calculating a further split score for each split of the partitions of the first data set and the second data set based on the third set of local sums and the fourth set of local sums;
adding a further noise term to each further split score to generate a further noisy score for each split of the partitions;
selecting a split of the partitions with a highest noisy score as a further optimum split; and
generating the predictive model using the further optimum split.

7. The system of claim 1, wherein the predictive model does not expose data for individual data points of the first data set and the second data set.

8. The system of claim 1, wherein said calculating the split score for each split comprises using a local sum for each split to evaluate the equation:

$$-\frac{1}{|I_0|}\left(\sum_{i \in I_0} y_i\right)^2 - \frac{1}{|I_1|}\left(\sum_{i \in I_1} y_i\right)^2$$

in which:
$\Sigma$ represents a summation symbol,
$\in$ represents a set symbol,
i represents an integer,
$I_0$ represents a first split of the first data source or the second data source,
$I_1$ represents a second split of the first data source or the second data source, and
$y_i$ represents a true value within the first data source or the second data source.

9. The system of claim 1, wherein said calculating the split score and adding the noise term to each split score is a result of the equation:

$$-\frac{1}{|I_0|}\left(\sum_{i \in I_0} y_i + \text{noise}\right)^2 - \frac{1}{|I_1|}\left(\sum_{i \in I_1} y_i + \text{noise}\right)^2$$

in which:
$\Sigma$ represents a summation symbol,
$\in$ represents a set symbol,
i represents an integer,
$I_0$ represents a first split of the first data source or the second data source,
$I_1$ represents a second split of the first data source or the second data source,
$y_i$ represents a true value within the first data source or the second data source, and noise represents the noise term.

10. The system of claim 1, wherein the operations further include:
generating noisy node values for data points of the first data set and the second data set according to the equation:

$$\frac{\sum_{i \in I} y_i}{|I|} + \text{Lap}\left(\frac{a}{\epsilon}\right)$$

in which:
$\Sigma$ represents a summation symbol,

∈ represents a set symbol, i represents an integer,

I represents a number of elements that are in a terminal node or child node of the predictive model, $y_i$ represents a true value within the first data source or the second data source, $\epsilon$ represents a privacy budget, Lap represents a Laplacian distribution, $\alpha$ represents a maximum value a record of the first data source or the second data source can have; and generating the predictive model using the optimum split and the noisy node values.

11. A computer-implemented method, comprising:

receiving a first set of local sums from a first data source and a second set of local sums from a second data source, the first set of local sums representing sums of data points across different splits of a first data set, and the second local sums representing sums of data points across different splits of a second data set;

calculating a split score for each split of the first data set and the second data set using a loss function that represents a variance of individual sums of the first local sums and the second local sums from data points in the first data set and the second data set, respectively;

adding a noise term to each split score to generate a noisy score for each split;

selecting a split with the highest noisy score as an optimum split;

generating a predictive model using the optimum split, the predictive model being evaluable using a set of input data to generate a predicted result value;

applying the set of input data to the predictive model;

ascertaining an output of the predictive model; and performing, by a computing device, an action, based on the output of the predictive model.

12. The method of claim 11, wherein the split with the highest noisy score corresponds to a split with the highest loss reduction.

13. The method of claim 11, further comprising generating noisy node values for data points of the first data set and the second data set, and wherein said generating comprises generating the predictive model using the optimum split and the noisy node values.

14. A computer-implemented method, comprising:

calculating a first set of sums for a first set of splits that represent ways of partitioning a set of data;

communicating the first set of sums to an external service;

receiving from the external service an optimum split for splitting the set of data, the optimum split being based on a first split score calculated for each split of the first set of splits using a loss function that represents a variance of individual sums of the first set of sums;

partitioning the set of data using the optimum split into a first data subset and a second data subset;

determining a second set of sums for a second set of splits that represent ways of partitioning the first data subset and the second data subset;

communicating the second set of sums to the external service;

receiving a predictive model from the external service, the predictive model being based on a second split score calculated for each split of the second set of splits of using the loss function that represents the variance of individual sums of the second set of sums and being evaluable to using a set of input data to generate a predicted result value;

applying the set of input data to the predictive model;

ascertaining an output of the predictive model; and performing, by a computing device, an action based on the output of the predictive model.

15. The method of claim 14, wherein the first set of sums represent sums of data points across individual splits of the first set of splits, and the second set of sums represent sums of data points across the second set of splits.

16. The method of claim 14, wherein the first set of sums and the second set of sums are communicated to the first external service without exposing data values for data points of the set of data.

17. The method of claim 14, wherein one or more sums of the first set of sums are calculated as: $Y_{j,0} = \Sigma_{i \in I_{j,0}} y_i$ and $Y_{j,1} = \Sigma_{i \in I_{j,1}} y_i$, in which:

$\Sigma$ represents a summation symbol,

∈ represents a set symbol, i represents a first integer, j represents a second integer, $I_{j,0}$ represents a first side of a particular split of the data set, $I_{j,1}$ represents a second side of the particular split of the data set, and $y_i$ represents a true value within the data set; and wherein $Y_{j,0}$ is a sum of data points on the first side of the particular split, and wherein $Y_{j,i}$ is a sum of data points on the second side of the particular split.

* * * * *